(12) United States Patent
Fujii

(10) Patent No.: US 8,852,485 B2
(45) Date of Patent: Oct. 7, 2014

(54) DRY-FORMING THREE DIMENSIONAL WOOD FIBER WEBS

(76) Inventor: John S. Fujii, Vancouver, WA (US)

( * ) Notice: Subject to any disclaimer, the term of this patent is extended or adjusted under 35 U.S.C. 154(b) by 575 days.

(21) Appl. No.: 11/570,745

(22) PCT Filed: Jun. 9, 2005

(86) PCT No.: PCT/US2005/020634
§ 371 (c)(1),
(2), (4) Date: Dec. 7, 2007

(87) PCT Pub. No.: WO2006/002015
PCT Pub. Date: Jan. 5, 2006

(65) Prior Publication Data
US 2008/0197536 A1    Aug. 21, 2008

Related U.S. Application Data

(60) Provisional application No. 60/580,282, filed on Jun. 15, 2004.

(51) Int. Cl.
| | | |
|---|---|---|
| B29C 59/02 | (2006.01) | |
| B29C 51/08 | (2006.01) | |
| B27N 5/00 | (2006.01) | |
| B29C 43/00 | (2006.01) | |
| B27N 3/08 | (2006.01) | |
| B29K 105/26 | (2006.01) | |

(52) U.S. Cl.
CPC ............ B27N 3/08 (2013.01); B29C 51/082 (2013.01); B27N 5/00 (2013.01); B29C 43/003 (2013.01); B29C 59/02 (2013.01); B29K 2105/26 (2013.01)
USPC .......................................................... 264/320

(58) Field of Classification Search
USPC .......................................................... 264/320
See application file for complete search history.

(56) References Cited

U.S. PATENT DOCUMENTS

| | | | |
|---|---|---|---|
| 4,503,115 A * | 3/1985 | Hemels et al. ............... 442/161 |
| 4,702,870 A | 10/1987 | Setterholm et al. | |
| 4,726,863 A | 2/1988 | Cline | |
| 4,828,913 A | 5/1989 | Kiss | |
| 5,198,236 A | 3/1993 | Gunderson | |
| 5,277,854 A | 1/1994 | Hunt | |
| 5,314,654 A | 5/1994 | Gunderson | |
| 5,316,828 A | 5/1994 | Miller | |
| 5,677,369 A * | 10/1997 | Walsh ............................ 524/14 |
| 5,900,304 A * | 5/1999 | Owens ......................... 428/182 |
| 6,368,544 B1 | 4/2002 | Owens | |
| 6,451,231 B1 | 9/2002 | Harrison et al. | |

(Continued)

FOREIGN PATENT DOCUMENTS

| | | |
|---|---|---|
| DE | 3814997 A1 | 9/1989 |
| DE | 10140305 A1 | 3/2003 |

(Continued)

*Primary Examiner* — Robert J Grun
(74) *Attorney, Agent, or Firm* — Marger Johnson & McCollom, PC

(57) ABSTRACT

A method for the dry-formation of a deep drawn, three-dimensional wood fiber structural core is provided. The method comprises providing a preformed, substantially flat, dry-formed mat of wood fibers, providing a three-dimensional mold, introducing the dry-formed mat of wood fibers into the three-dimensional mold, and drawing and molding the mat of wood fibers into said three-dimensional wood fiber structural core.

21 Claims, 11 Drawing Sheets

(56) References Cited

U.S. PATENT DOCUMENTS

| | | | |
|---|---|---|---|
| 6,451,235 B1 * | 9/2002 | Owens | 264/86 |
| 6,783,714 B1 | 8/2004 | Locati | |
| 2003/0168769 A1 | 9/2003 | Walsh et al. | |
| 2003/0170438 A1 * | 9/2003 | Lynch et al. | 428/213 |

FOREIGN PATENT DOCUMENTS

| | | |
|---|---|---|
| JP | 58220723 A | 12/1983 |
| JP | 2000-153512 | 6/2000 |
| JP | 2003514691 A | 4/2003 |
| WO | WO01/38057 A1 | 5/2001 |

\* cited by examiner

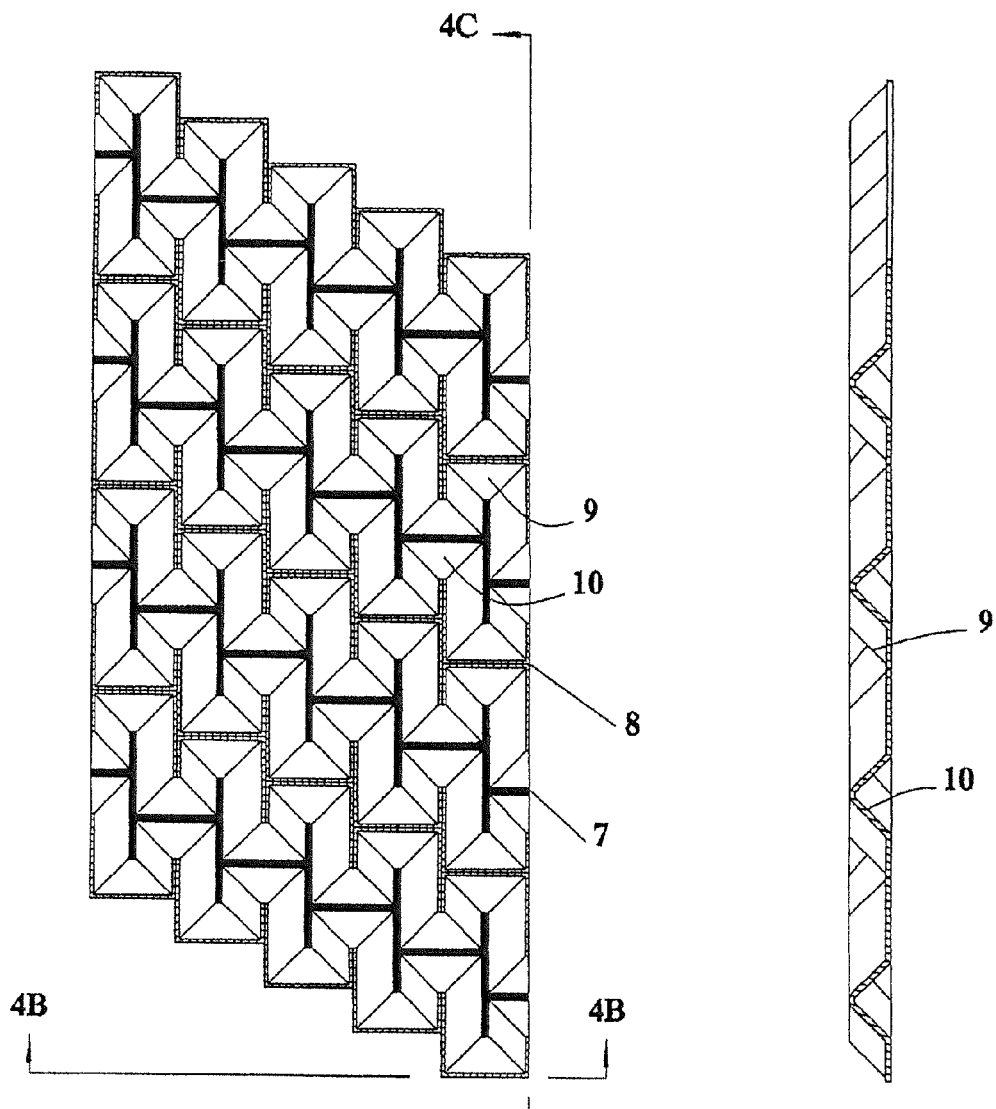
FIG. 4A
PRIOR ART
FIG. 4C
PRIOR ART
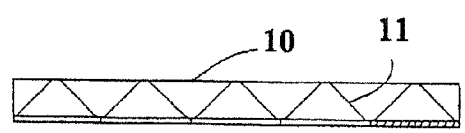
FIG. 4B
PRIOR ART

DRY-FORMING THREE DIMENSIONAL WOOD FIBER WEBS

BACKGROUND

A wide variety of forest products are manufactured from wood fibers. U.S. Pat. No. 5,900,304, which is incorporated herein in it's entirety by reference, focuses upon a class of wood-fiber products that are molded in three dimensions under conditions of heat and pressure to produce a structural wood fiber web that serves as the principal structural component of composite structural-fiberboard panels. The geometry of the web permits the use of a simple rigid mold that may be pressed together with one-dimensional forces. When the fiber web is bonded to sheet coverings or facings to produce a composite panel product, the composite structure forms a strong, lightweight, rigid three-dimensional truss.

Other fiberboard products having three-dimensional elements. For example, U.S. Pat. No. 4,702,870 ("US '870"), which is incorporated herein in it's entirety by reference, describes a method and apparatus for forming three-dimensional structural components from wood fiber. This method and apparatus require the use of a resilient mold insert to form three-dimensional features in the finished fiberboard product. The resilient mold insert is most commonly composed of an array of elastomeric protuberances. The elastomers are attached to a rigid support plate. In mass-production of wood-fiber products, elastomeric mold elements can exhibit problems with compression-set and relatively rapid deterioration under the heat and pressure necessary for product consolidation and drying. As a result, the elastomeric mold elements have a relatively short lifetime and need to be frequently replaced in high-speed production facilities. In addition to short mold lifetimes, the three-dimensional fiberboard objects disclosed are limited to objects having a flat face, backed by webs extending approximately normal to the flat face, backed by webs of identical fiber composition.

Heat transfer from the resilient mold insert of US '870 to the fiber mat is slow because of the low thermal conductivity of the elastomeric elements of the mold inert and because of long thermal-conduction pathways to regions of the fiber between the elastomeric mold elements. Slow heat transfer results in long drying times within the press, a major problem for this method, particularly for thick products. Drying speed may be increased using radiowave heating of the fiber mat, but this increases the complexity and cost of equipment used to form and dry the fiberboard products.

A process for making grids from fibers, described in U.S. Pat. No. 5,277,854, which is incorporated herein in it's entirety by reference, also uses the idea of a resilient mold insert which is capable of forming objects in three-dimensions. Because of the use of a resilient mold insert, this invention suffers from the same difficulties as does US '870. In addition, while this mold insert is capable of generating three-dimensional forces, it is used to generate a fiber product that has generally two-dimensional features only.

U.S. Pat. Nos. 5,198,236 and 5,314,654, which are incorporated herein in it's entirety by reference, describe a method and apparatus that uses a rigid mold to form three-dimensional features in structural fiberboard products. These fiberboard products are limited to flat-faced objects backed by webs extending approximately normal to the flat face. In addition, the rigid mold elements disclosed must be retracted during consolidation of the fiber. In U.S. Pat. No. 5,314,654, a second forming step is required using a resilient mold insert similar to that of US '870. Therefore, formation of this structural fiberboard product suffers from the same difficulties as have been pointed out for US '870. In addition, the need for retractable mold elements makes this method complex and expensive.

U.S. Pat. No. 5,316,828 ("US '828"), which is incorporated herein in it's entirety by reference, reveals a reinforced fluted medium and corrugated fiberboard that has increased strength and stiffness in comparison to conventional corrugated fiberboard due to the addition of three-dimensional elements in a simple corrugated fiberboard structure. The three-dimensional elements take the form of adhesive material applied along lines that are transverse to the flutes. The adhesive at least partially fills in and bridges across the valleys of the flutes, holding the corrugated board more rigid under compressive and bending stresses both along the corrugations and across the corrugations.

The structure of US '828 is therefore not formed as a single piece and requires multiple manufacturing steps. In addition, considerable adhesive is required to fill in the valleys to the top of the flutes. The adhesive could fill in and bridge only a small portion of the flutes in thick corrugated boards, making the technique ineffective for thick corrugated panels. Finally, application of adhesive to both sides of the fluted medium would increase product weight and material cost, and complicate board manufacture.

U.S. Pat. No. 4,726,863, which is incorporated herein in it's entirety by reference, describes a method for making a high-strength composite paperboard panel. The panel is composed of an undulated midstratum layer to which are adhesively bonded an underlayer and an overlayer. There is no variation of the structure along the flutes formed by the undulations, making the structure generally two-dimensional and placing it in a different structural class than the present invention. Because of its two-dimensional structure, which is similar to the structure of conventional corrugated boards, this panel product has less strength and stiffness across the undulations compared to along the undulations.

U.S. Pat. No. 5,900,304, which is incorporated herein in it's entirety by reference, describes a wet-formed three-dimensional core for structural composites. The three-dimensional wood-fiber web can be produced using a simple rigid mold pressed together with one-dimensional pressing forces. The fiber webs are made using a wet-forming process in which the wood fiber is prepared by mixing the fiber with water, thereby forming a slurry. The fiber web is formed as one piece under heat and pressure after most of the carrier fluid is drained or squeezed from the slurry as the rigid mold is pressed together. Once formed using the rigid mold, the fiber web contains corrugations that have syncline (V-shaped) indentations along the ridges of the corrugations on both sides of the web at spaced positions along the ridges of the corrugations. The opposite surface of the indentations form anticline (inverted V shaped) protrusions that function as corrugation stiffeners bridging across furrows of the corrugations. These elements produce sloped web surfaces. The valleys and ridges of these elements may be flat. Flat ridges provide an exterior surface for the application of adhesives that bond the web to additional components. Surfaces that are either sloping or flat allow formation of the web using a simple rigid mold that is pressed together using a one-dimensional pressing force.

In structural panel applications, sheets of material are adhesively bonded to the flat ridges of the shaped web on one or both sides of the web, providing smooth facings which cover the web. The web thereby serves as a stiff, light-weight structural core which is sandwiched between sheet facings to form a composite panel. The combined structure consists of a three-dimensional web bonded to sheet material.

U.S. Pat. No. 6,451,235, which is incorporated herein in it's entirety by reference, describes a wet process for forming a three-dimensional core from an aqueous slurry of fibers employing press drying to produce a strong core structure. Wet-formation techniques can be employed for producing deeply drawn three-dimensional structural cores using what is said to be the natural plasticity and conformability of wet fibers. The use of wet fibers can enable the forming, drawing and bonding of such structures without the use of complicated mold designs and complex formation processes.

A commercial product, SONOBoard™, based on technology described in U.S. Pat. No. 4,702,870, which is incorporated herein in it's entirety by reference, can utilize a complex deformable mold upon which an aqueous slurry of fibers can be formed into a three-dimensional honeycomb with one flat face. The wet pre-form composition can be wet-pressed and then transferred to a hot press wherein it can be press-dried to form a semi-rigid composite structure. Two of these structures can be laminated along the honeycomb face to produce a flat, rigid panel. Another form of this product is commercially known as Gridcore™.

SUMMARY

Drying of a wet-formed three-dimensional core has been determined to be too time consuming to complete and an inefficient method of formation. It requires an excessive amount of expensive thermal energy to implement the drying process of the wet formed material. Wet forming also requires that large volumes of water be recycled. The aqueous effluent contains fine fiber fragments and dissolved solids which are ultimately purged in waste water streams that require pollution abatement treatment.

As stated above, three-dimensional structural cores of the type described in U.S. Pat. No. 5,900,304 are produced using a wet-formation mold. A description of an exemplary mold for conducting the wet-formation process is provided in U.S. Pat. No. 5,900,304, at col. 5, lines 1-52 and col. 5, line 65 through col. 6, line 6.

Production of preferred deep drawn, complex three-dimensional structural cores from dry formed fibers has not been forthcoming due to prior art teachings which discusses inferior densification and development of mechanical properties in dry-formed panels due to lack of conformability and to "spring-back" of dry fibers. The prior art concluded that complicated and expensive apparatus and methods are requisite for forming and densifying dried fibers, due to the lack of flexibility and mobility required for forming deep draws and intimate fiber-to-fiber contact for achieving requisite bond strength in such complex three-dimensional structures.

However, it has been ascertained that employing a wet formation process is not a cost efficient or time effective method of producing these three-dimensional cores. Accordingly, it has now been determined that a mold of the type used in U.S. Pat. No. 5,900,304, that is intended for use in situations wherein significant water drainage of a wet fibrous mass occurs, and particularly in wet press drying from an aqueous fiber slurry, i.e., wet forming, can be employed in a dry-formation method. Thus, a uniformly strong complex core structure can be produced using a dry-formation process in spite of the fact that wet-formation fiber flow, high fiber plasticity and collapse that are requisite in the wet-formation of three-dimensional cores do not substantially transpire.

The subject dry-formation method can form three dimensional structural cores of high quality as compared to those produced by wet formation techniques. Furthermore, modifications in the design of the molds of U.S. Pat. No. 5,900,304 can be provided that improve their performance in dry-formed production of deeper cores while maintaining structural integrity, high strength and excellent laminating properties without telegraphing core patterns through the panel facings.

DESCRIPTION OF THE DRAWINGS

The invention will be better understood with reference to the accompanying drawings, also forming part of this disclosure, wherein:

FIG. 4 presents a top view (4A), end view (4B) and side view (4C) of a fiber web having staggered syncline indentations and anticline protrusions between the corrugations.

DETAILED DESCRIPTION

Figure 1:
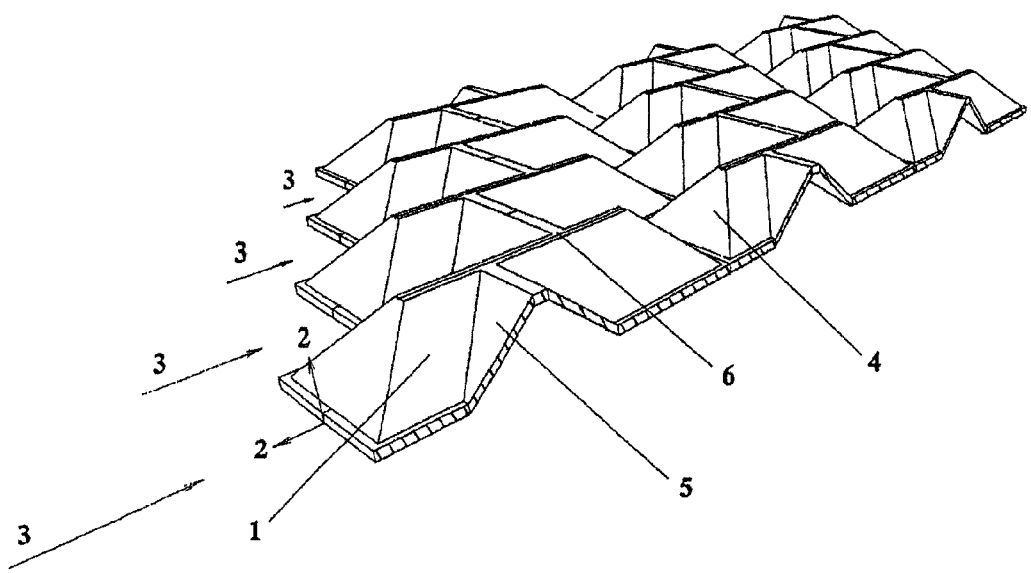
FIG. 1 is a perspective rendering of a first embodiment of the molded fiber web showing the corrugations and syncline indentations on one side of the web with indentations staggered along adjacent ridges of the corrugations.

The exemplary structures depicted herein are similar in design to those produced in U.S. Pat. No. 5,900,304 except that they employ a dry-formation method not a wet-forming method. Perspective renderings of different views of the embodiment are shown in the FIGS. 1-3 to clarify the basic structure of the web. The structure depicted in FIG. 1 shows an upper surface view of the pressed-fiber web consisting of a series of undulations or corrugations 1 along which are numerous V-shaped openings (referred to hereinafter as syncline indentations 4) downward into the ridges of the corrugations and other numerous inverted-V-shaped protuberances (referred to hereinafter as anticline protrusions 5) upward from the valleys of the corrugations. The anticline protrusions 5 may have the same height as the corrugations, as shown in FIG. 1, or they may be set back from the ridges of the corrugations.

The direction of the axes of the corrugations are indicated by the arrows 3 in FIG. 1, for reference. For webs that are formed about a plane, the midplane of the web may be defined as a horizontal plane which passes through the middle of the structure in the narrow overall height dimension. The midplane is generally normal to the direction in which force is applied to form the web.

The direction of the valleys of the syncline indentations 4 and the ridges of the anticline protrusions 5 are approximately normal to the axes of the corrugations. Other relative angles may be used if desired. The anticline protrusions 5 are formed by indenting the valleys of the corrugations from the underside of the structure shown in FIG. 1. Both the syncline indentations 4 and the anticline protrusions 5 are indentations into corrugation ridges made in the same fashion but from opposite sides of the fiber web structure.

The walls formed by the syncline indentations 4 and anticline protrusions 5 span or bridge the space between adjacent walls of the corrugations. By bridging this space, the syncline indentations 4 and anticline protrusions 5 can act as a gusset or stiffener for the corrugations 1. They can also provide strength and stiffness in directions normal to the axes of the corrugations. The fiber web can hold its as-molded form without the need for additional support. The self-supporting feature of the fiber web makes assembly into stacked configurations very simple and convenient. The self-supporting feature also allows the web to be used in the as-molded condition, which can be useful in some packaging applications.

The peaks or ridges 6 of the structure on both the top and bottom surfaces of the web may be flat. These flat features along the ridges form surfaces that are convenient and can be effective sites for the application of adhesives used to bond the structure to various types of sheet coverings or facings, or to bond several webs together to form stacked configurations. As depicted in FIG. 1, these flat-topped ridges may comprise peaks or ridges of the anticline protrusions 5 in addition to peaks or ridges of the corrugations 1.

Figure 2:
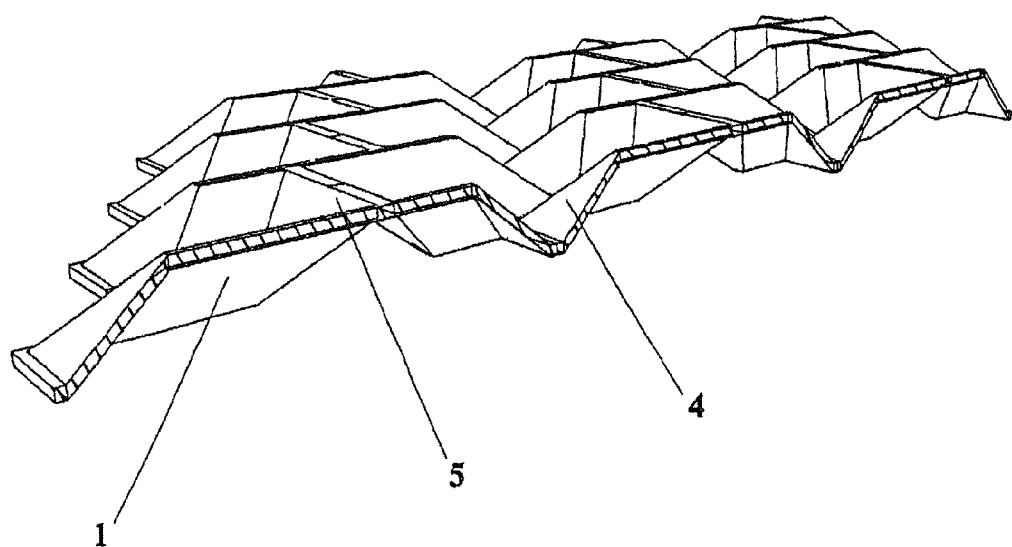
FIG. 2 is an additional perspective view of the fiber web revealing a cutaway section through the ridge of the front corrugation of the web shown in FIG. 1.
Figure 3:
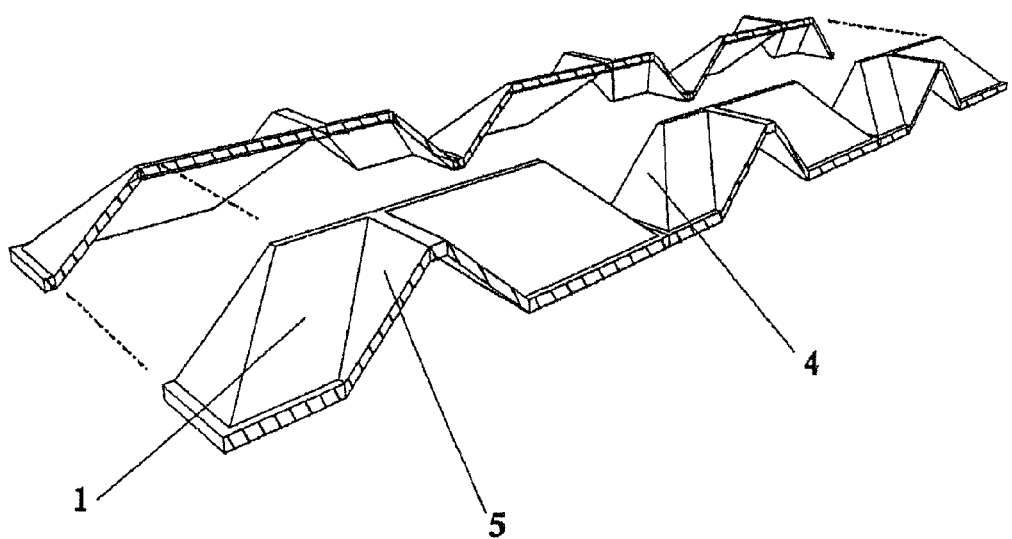
FIG. 3 is a perspective rendering of a break-away of a single corrugation of the fiber web depicted in FIG. 1, where the corrugation is sectioned along a plane through the peak or ridge of the corrugation.

FIG. 2 provides a further perspective drawing of the first embodiment. In this view, the structure shown in FIG. 1 has been sectioned along plane 2-2 of FIG. 1 to reveal some of the features of the cross-section and the underside of the structure. FIG. 3 is another perspective drawing showing a single corrugation that has been split apart at a plane through the middle of the corrugation. The formation of the anticline protrusions 5 by indentation of the valleys of the corrugations is clarified in FIGS. 2 and 3. The structure is a relatively thin three-dimensional web having sloping surfaces and flat ridges.

The topology of the structure of the present invention permits formation of the three-dimensional web as a single continuous piece in a single molding operation using a simple rigid mold that is pressed together with one-dimensional forming forces. The top and bottom mold surfaces used to form the present invention contain negative impressions of the top and bottom surfaces, respectively, of the structure. Unidirectional mold pressure is applied in a direction generally normal to the planar axis or midplane of the web structure.

The ability to form the fiber web as a single piece in a single molding step using a rigid mold is characterized in that the web surfaces comprise single-valued functions of coordinates of the midplane of the structure. No part of the web is therefore intersected more than once as the mold moves towards the web in its finished form. No part of the web folds back on itself or has hollow regions, which would otherwise make rigid mold access impossible in a single molding step to form a single continuous web.

Just as the angled or sloped surfaces of the web permit ready formation of the three-dimensional web structure, they also permit ready separation of the mold from the web after formation of the web. Excellent mold-release properties are provided.

FIG. 4A shows a top view of a three-dimensional fiber web that is similar to the web depicted in FIGS. 1 and 2. In this case, a little larger web is shown having more indentations and protrusions. The top view shows a skewed shape intentionally, in order to clarify the web structure or pattern. The web can be made to have a rectangular perimeter or any other perimeter shape by trimming the edges or forming the web with the desired perimeter shape.

In FIG. 4A, the flat-topped ridges 7 of the structure are represented by the heavy black lines in the top view, while the flat-bottomed valleys 8 are represented by the hatched pattern in the top view. As already mentioned in connection with FIGS. 1-3, the flat portion of the ridges 7 forms an excellent surface for applying adhesive used to bond the web to facings or other fiber webs. The thin angled lines in the top view are the edges of syncline indentations into the paper and anticline protrusions out of the paper. Thus, the diamond shaped elements in FIG. 4 containing hatched horizontal lines represent syncline indentations 9, while those containing heavy solid lines represent anticline protrusions 10.

FIG. 4B shows a lower-edge view of the structure depicted in FIG. 4A. The view presented in FIG. 4B is indicated by cross section 4B-4B in FIG. 4A. An end view of the corrugations 11 and the sides of the anticline protrusions 10 are visible in this view. FIG. 4C shows a right edge view of the web showing yet another view of the syncline indentations 9 and anticline protrusions 10. The right edge view in FIG. 4C is indicated by cross section 4C-4C in FIG. 4A.

In FIG. 4, the positions of the syncline indentations 9 and the anticline protrusions 10 are staggered along adjacent corrugations. By staggering these elements, bending strength and stiffness may be imparted to the structure both along the corrugations and across the corrugations.

Figure 5A:
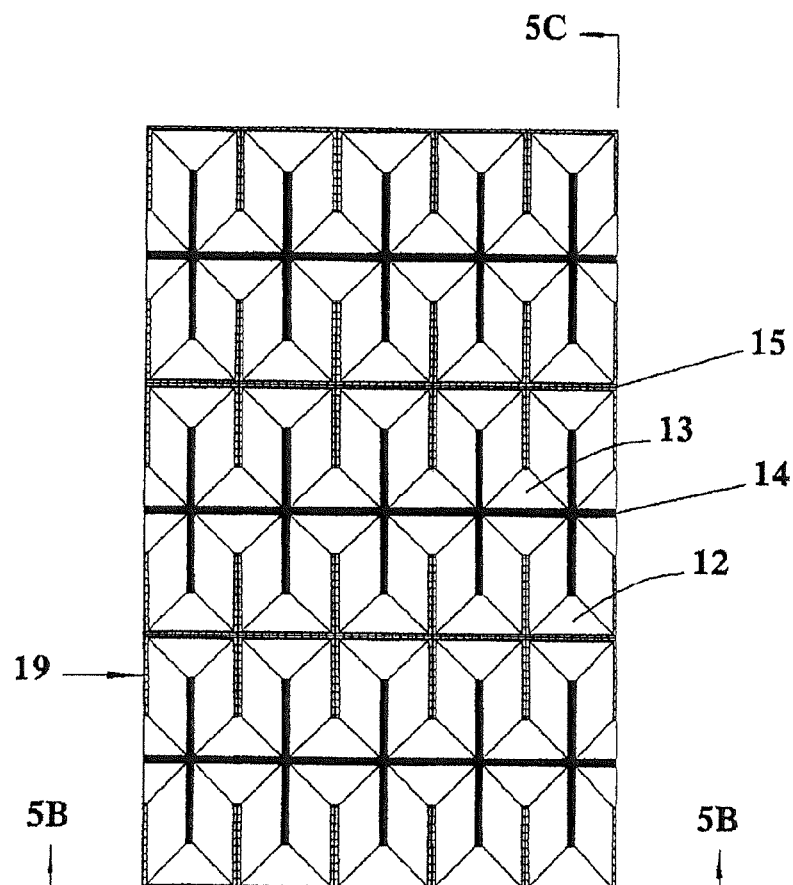
FIG. 5 shows a top view (5A), end view (5B), and side view (5C) of a second embodiment of the invention showing the syncline indentations and anticline protrusions lined up across the web.
Figure 5C:
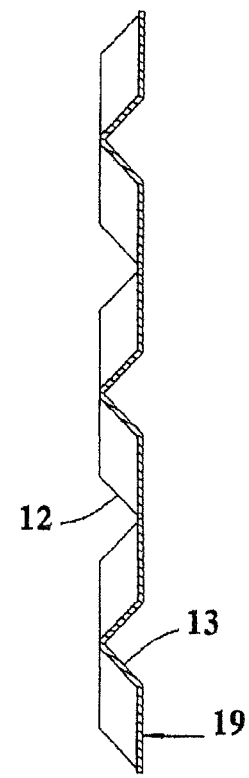
Figure 5B:
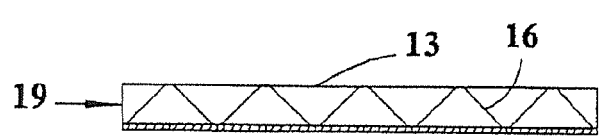

FIG. 5A is a top view of a web in which syncline indentations 12 and anticline protrusions 13 are lined up in a direction normal to the corrugations to facilitate bending or folding of the web across the corrugations. A lower edge view of this embodiment is shown in FIG. 5B and a right edge view is shown in FIG. 5C. The topology of this particular embodiment permits the use of molds that can be readily machined on three-axis milling machines from a single piece of rigid material. Somewhat greater distances are shown between the indentations and protrusions in FIG. 5, compared to FIG. 4, to illustrate the fact that the spacing and position of the syncline indentations 12 and anticline protrusions 13 can be varied. The appropriate positions and spacing will be determined by product application requirements such as strength across the corrugations, economics of mold fabrication, final product shape, and end use.

The ability to fold or bend the web is an advantage in numerous applications. For example, in the manufacture of boxes, the web may be folded at the corners and subsequently covered with a facing to produce a smooth surface. Box assembly in this sequence is greatly facilitated by the fact that the webs are self-supporting in the as-molded condition. Either stiff sheet materials, such as wood, metal and hard plastics, or more flexible sheet materials, such as thin fiberboard or paperboard, may be applied to the web to form the box surface in this case. Using a different assembly sequence, folding may be performed after the facing is applied to the web, as is done in conventional corrugated board manufacture. In this case, the facing must be flexible in order to allow the facing to be creased along the fold line prior to bending.

It is also possible to form a fiber web composed of staggered indentations and protrusions over most of the area of the web except along predetermined fold lines. Along these fold lines, the indentations and protrusions would be lined up. Using a combination of linear and staggered web features, readily folded panels may be produced that are rigid both along the corrugations and across the corrugations.

Figure 6:
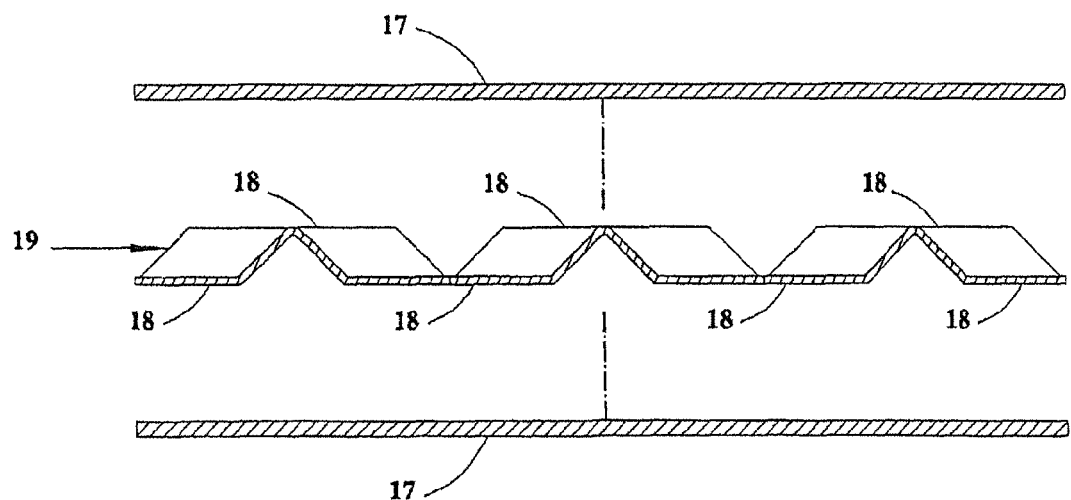
FIG. 6 shows a panel embodiment having sheet facings bonded to the ridges of the fiber web forming a rigid three-dimensional truss structure.

FIG. 6 illustrates smooth, flat-surface sheets 17 that may be bonded to the ridges 18 of the fiber web 19. A web 19 like that illustrated in FIG. 5 can be drawn. The composite structure becomes a flat surface panel with a fiber web 19 backing or core. The sheet material 17 applied to the web 19 spans the gap across the tops of the syncline indentations 12 forming a rigid three-dimensional truss. The three-dimensional truss formed in this way imparts considerable stiffness to the composite panel.

The smooth surface sheets 17 applied to the web provide excellent surfaces for printing and displaying text and graphics, useful for conveying information and advertising. Printing may be performed either before or after the sheets are joined to the web. While shown as a generally flat panel in FIG. 5, curved shapes are also readily produced by forming or bending the web 19 in an arc and bonding flexible sheets to the web 19 so that the sheets follow the curvature of the fiber web 19.

For any of the embodiments of the fiber web, many different materials may be used in the sheet facing. For example, the facings may consist of wood veneers, sheets of wood-fiber-based material, wood-based-particle panel materials, plastic or metal sheets.

Figure 7A:
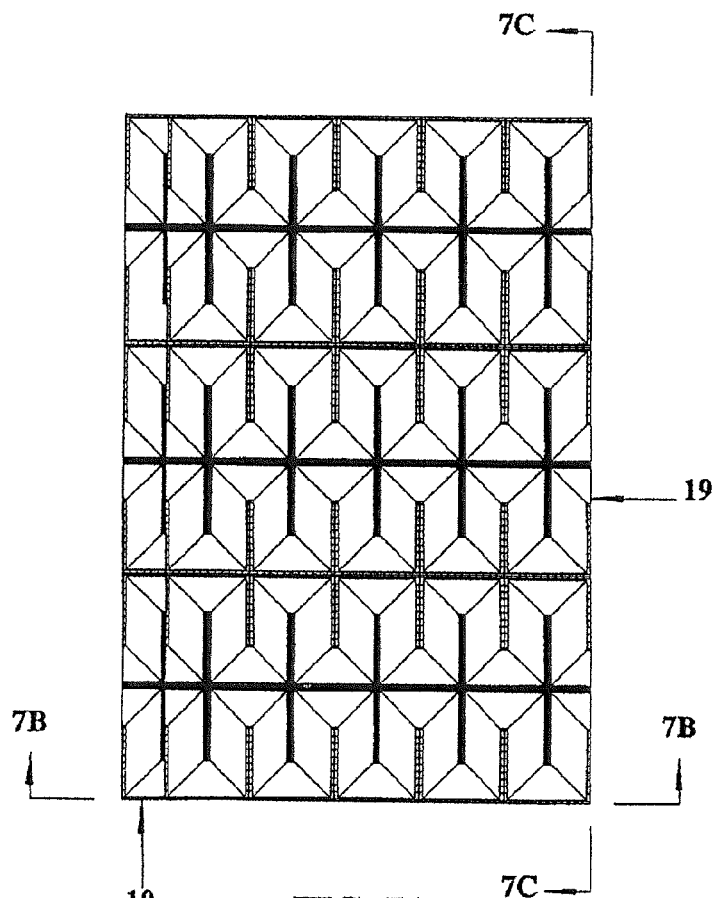
FIG. 7 shows a top view (7A), end view (7B), and side view (7C) of a plurality of fiber webs stacked and bonded along ridges to form a thick, rigid fiber structure. Each web in the stack has the form of the second embodiment of the web, shown in FIG. 5. Other web embodiments may also be used in stacked configurations.
Figure 7B:
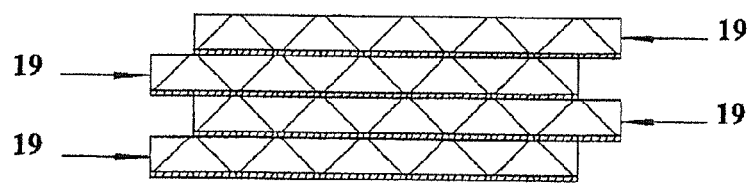
Figure 7C:
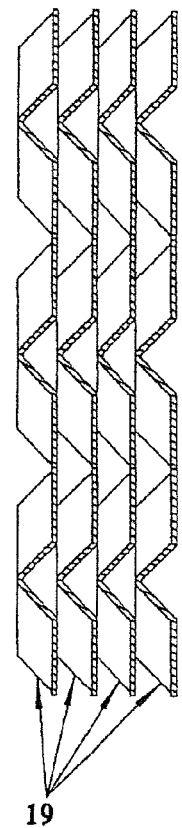

FIG. 7A is a top view of an embodiment in which several individual fiber webs 19 are bonded together in a stacked configuration. FIG. 7B is a bottom edge view of the stack of webs and FIG. 7C is a right edge view of the stacked web. The webs 19 may be readily bonded along the surfaces formed at the ridges 14 of the individual webs 19. By staggering the webs 19 as shown in the edge view of FIG. 7B, the gaps at the top of the syncline indentations 12 are bridged by stiff portions of the ridges 14 of adjacent webs 19. In this way, the structure becomes a complex rigid three-dimensional truss having considerable stiffness in all directions. Stiffness is attained in this case without the use of sheet facings.

Even webs made with indentations that are lined up, as in FIG. 5, may be made stiff in all directions, including across the fold-line of the indentations, by stacking the webs. This is because the stiff bridges formed across the gaps of the indentations in properly stacked configurations, resist closure of the indentations under bending forces. By lining up the indentations in the webs, stiffness can be maintained both along and across the corrugations in these stacked configurations.

For a given panel thickness, stacked-webs generally have better thermal insulating properties than do panels consisting of only a single large web. This advantage is due primarily to the separation or partitioning of air spaces through the thickness of the stacked web. By partitioning the air spaces, circulating air currents are broken up and isolated from each other. Heat transfer through the thickness of the stacked web due to heat convection along these air currents is thereby minimized.

While not shown in FIG. 7, sheets of material may also be applied between webs 19 within the stack of webs. This additional layering of sheet material imparts additional strength and stiffness to the composite panel and increased convective heat-transfer resistance across the panel. Increased convective heat-transfer resistance results from further separation and partitioning of the air spaces within the stacked web in these embodiments.

As an additional benefit of adding sheet materials between the webs 19 in stacked configurations, adhesive bonding of the various layers can be simplified. This advantage arises because the sheets provide broad bonding surfaces. In this circumstance, adjacent layers of the stack do not need to be positioned as accurately as is necessary without the sheet layers. Without the sheet layers, web ridges, 7 and 14, must be carefully aligned before they are bonded.

Figure 8:
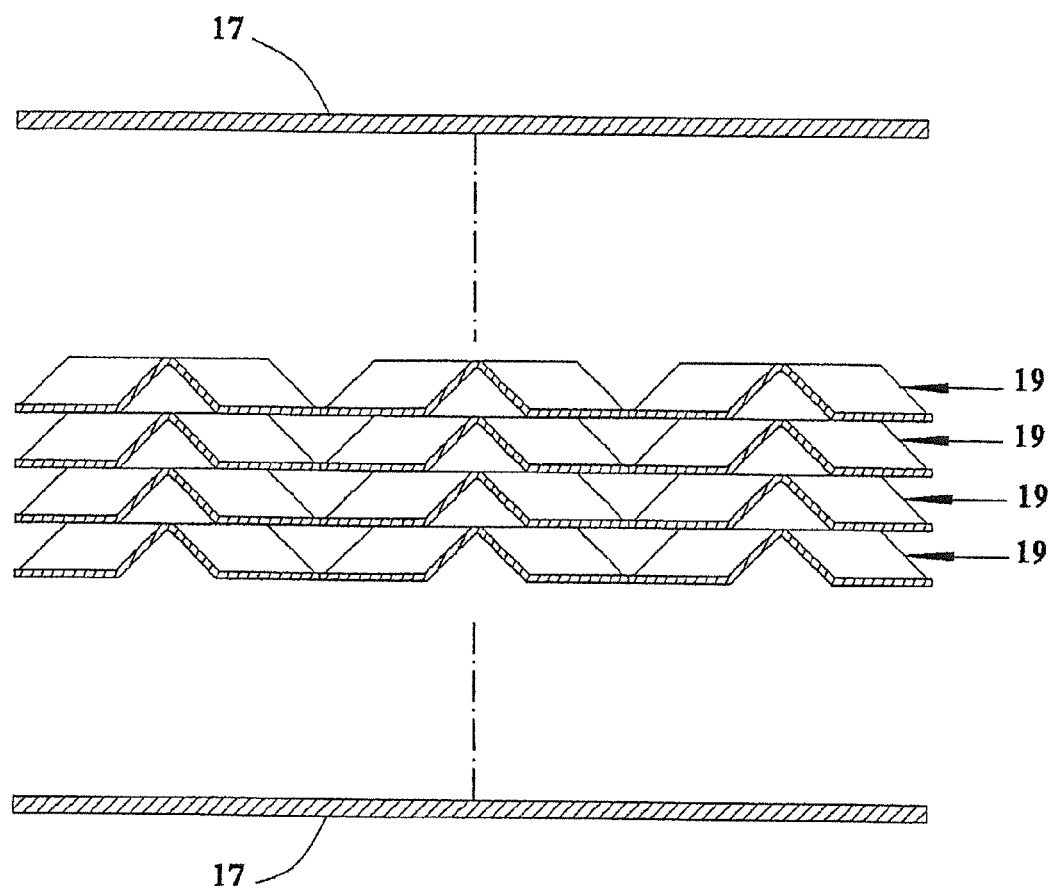
FIG. 8 is an assembly drawing of the stacked web of FIG. 7 and sheet facings that attach to the exterior ridges of the outer webs to form a rigid structure with flat exterior surfaces.

FIG. 8 depicts the application of sheet facings 17 to the ridges 14 of exterior webs of the stacked configuration, to give the stack greater stiffness and a smooth surface. Sheets may or may not be placed between webs 19 within the stack, depending upon the application.

Figure 9:
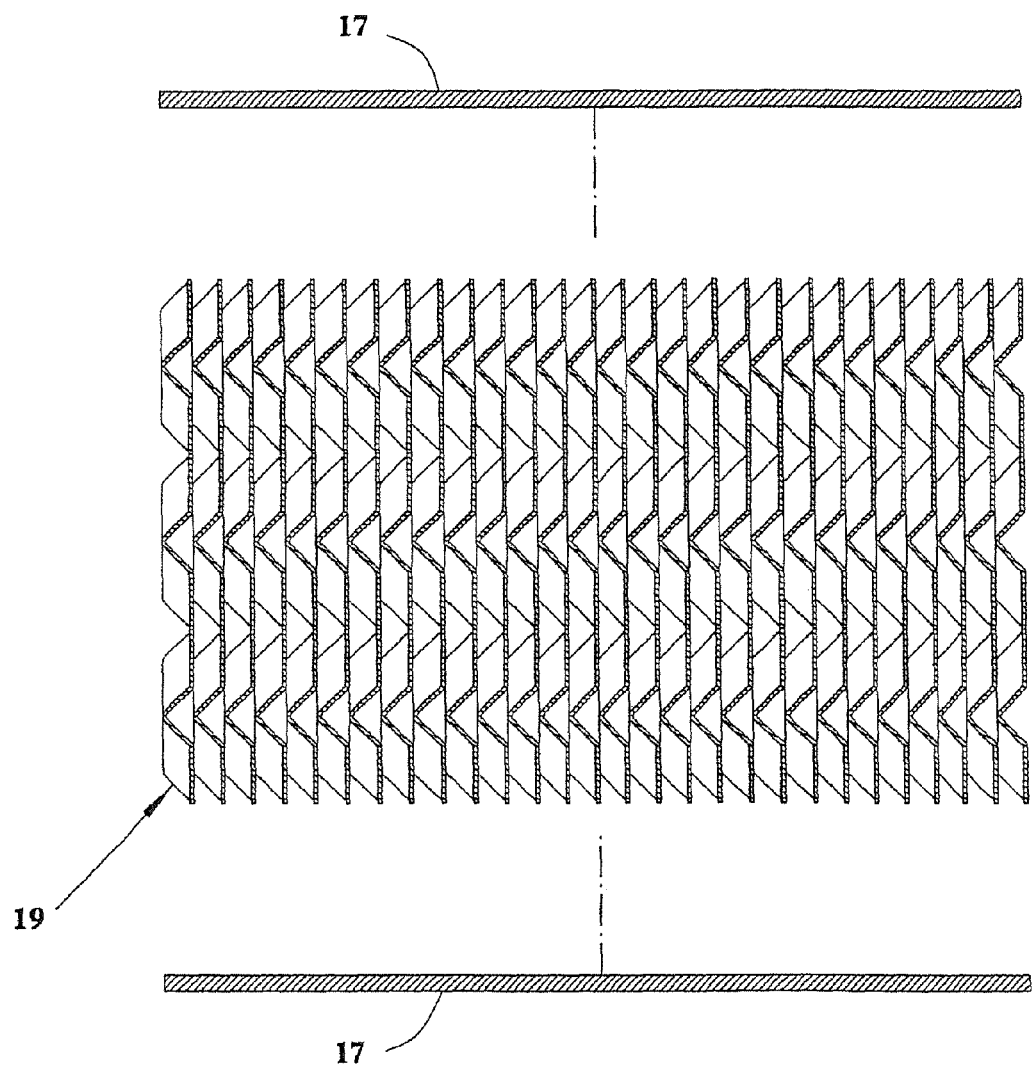
FIG. 9 shows a panel product made by stacking the webs horizontally using relatively large numbers of web sections, and then bonding sheet facings to the vertical edges of the stacked webs. Individual webs shown in the stack in FIG. 9 have the same form as the second embodiment of the web, shown in FIG. 5. Other web embodiments may also be used in stacked configurations.

FIG. 9 shows an embodiment in which numerous webs 19 are stacked horizontally. In this case, sheet facings are applied to the edges of the stack rather than to the exterior web ridges 14. For this configuration, individual webs would typically have a narrow width (height dimension in FIG. 9) relative to web overall length (dimension into the paper in FIG. 9). The stacked web and sheet facings depicted in FIG. 9 would be useful in the formation of relatively thick beams and platforms in which heavy loads are applied to the edges of the webs 19. In addition, sheet coverings along the edge of stacked panels would keep debris from entering the stack of webs.

Once again, sheet materials may be placed between webs within the stack shown in FIG. 9 to impart additional strength and stiffness to the composite structure. While not shown in FIG. 9, sheet facings may also be readily applied to the edges of the composite panel at the right, left and facing views of the structure depicted in FIG. 9. With the addition of these sheet facings, the composite panel would be completely enclosed on all sides by smooth facings.

It is also possible to nest the fiber webs. By bonding multiple webs together in nested configurations, the strength and stiffness of the webs can be substantially increased compared to the strength and stiffness of a single web. Nesting permits web thickness, strength and stiffness to be varied over a wide range using only a single web configuration and a single forming apparatus.

The invention in its various forms can be used to make a wide variety of structural products in packaging, material handling, construction and furniture industries. Products include pallets, bulk bins, heavy duty boxes, shipping containers, wall panels, roof panels, cement forms, partitions, poster displays, reels, desks, caskets, shelves, tables, and doors.

The invention can be formed from wood fibers of all types. It can be formed with wood fiber alone, containing no chemical additives, making products easily recyclable. It can also be formed with resin or binder additives to enhance properties. The invention can also include various other additives and treatments to impart specific properties to the structure such as resistance to water, fire, and insects.

Using the molds described above in U.S. Pat. No. 5,900, 304, the following example of a dry-formation process which can be conducted:

A preformed, substantially flat mat is first dry-formed from treated wood fibers. These wood fibers can include, for example, whole wood fibers comminuted in a revolving disc refiner from wood chips, sawdust or planer shavings, recycled kraft or old corrugated fibers, old newspapers or other forms of recycled paper.

The wood fibers can be blended with recycled or virgin plastic materials and other components selected to impart specific properties to the final product including, but not limited to, polyethylene, polyvinyl chloride, fire retardant compounds, clays, wet strength additives, waxes, and/or biocides. For instance, urea formaldehyde or phenol formaldehyde resins, methylene diisocyanate resin or related binders, can be added to the wood fibers.

Adhesive is typically blended with the above wood fibers to achieve thorough mixing and dispensing of the adhesives. These adhesives are employed to bond the wood fibers into a preformed, substantially flat, dry-formed mat of wood fibers and ultimately into a three-dimensional wood fiber structural core. The adhesive bonding system of the present invention generally comprises an isocyanate polymer and/or an aldehyde polymer resin. The adhesive bonding system can also be an isocyanate/latex copolymer or a phenol-formaldehyde/latex copolymer. Another adhesive bonding system which can be employed herein is a soy-based adhesive system which comprises an aldehyde-free wet strength additive that can be applied to wood fibers in a single admixture addition or sequentially in a two-component adhesive application. The polymers, which form the adhesive bonding system, are typically in liquid form so that they can be applied directly to a major surface of a layer of lignocellulosic material. The polymer resins can be combined together prior to their application.

The aldehyde polymer resins can comprise thermosetting resins such as phenol-formaldehyde, resorcinol-formaldehyde, melamine-formaldehyde, urea-formaldehyde, modified lignosulfonates, urea-furfural and condensed furfuryl alcohol resins. The phenolic component can include any one or more of the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The isocyanate polymer may suitably be any organic isocyanate polymer compound containing at least 2 active isocyanate groups per molecule, or mixtures of such compounds. Generally, the isocyanate polymers employed in the method of this invention are those which have an isocyanato group functionality of at least about two. Preferably, this functionality ranges from 2.3 to 3.5 with an isocyanate equivalent of 132 to 135. The isocyanato functionality can be determined from the percent available NCO groups and the average molecular weight of the isocyanate polymer composition. The percent available NCO groups can be determined by the procedures of ASTM test method D1638.

The isocyanate polymers which can be employed in the method of the present invention can be those that are typically employed in adhesive compositions, including typical aromatic, aliphatic and cycloaliphatic isocyanate polymers. Representative aromatic isocyanate polymers include 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4'-triisocyanatodiphenyl ether, 2,4-bis(4-isocyanatobenzyl)phenylisocyanate and related polyaryl polyiscocyanates, 1,5-naphthalene diisocyanate and mixtures thereof. Representative aliphatic isocyanate polymers include hexamethylene diisocyanate, xylylene diisocyanate, and 1,12-dodecane diisocyanate and lysine ethyl ester diisocyanate. Representative cycloaliphatic isocyanate polymers include 4,4'-methylenebis (cyclohexyl isocyanate), 1,4-cyclohexylene diisocyanate, 1-methyl-2,4-cyclohexylene diisocyanate and 2,4-bis (4-isocyanatocyclhexylmethyl)cyclohexyl isocyanate.

The isocyanate polymer is typically applied in its liquid form. Generally, when a phenol-formaldehyde resin is used as the phenolic resin it is present in the adhesive composition used in the method of the present invention within the range of about 50 to 90% by weight, preferably within the range of about 60 to 80% by weight of the total amount of adhesive. Generally, the isocyanate polymer is present in an amount of preferably from about 3 weight %, more preferably from about 5 weight %, most preferably from about 7 weight %, up to about 30 weight %, more preferably up to about 25 weight %, and most preferably up to about 20 weight %, based on the total weight of the mat of wood fibers. When the adhesive bonding system is used according to these percentages, one achieves a commercially attractive combination of desired board properties and economic advantages.

The forming of a pre-formed, substantially flat, dry mat of treated wood fibers can be accomplished by feeding the treated dry wood fibers, or blends thereof, through the air by gravity at controlled rates. These gravity-fed, treated dry wood fibers or blends are uniformly distributed over a planar forming area or vacuum forming bed to form a mat having a predetermined basis weight (weight per unit area). This mat is then pre-compressed to increase its mechanical cohesiveness sufficiently for subsequent handling and loading into a discontinuous or continuous hot press outfitted with the three-dimensional molds of type outlined in U.S. Pat. No. 5,900, 304.

The pre-formed, pre-compressed, flat dry mat is then pressed between the three-dimensional molds for a pre-determined period of time using pressing protocols that are sufficient to allow the preformed, pre-compressed, dry mat to be drawn and molded into a three-dimensional structure in a single pressing motion. Preferred single pressing motions for forming the subject cores can be effected within an intermittent or continuous mold configuration.

These mats are introduced into the molds in a plane parallel to the longitudinal/transverse axes of the mat. During the pressing cycle, the thermosetting binder, waxes and other additives are cured as the mat is drawn within the three-dimensional contours of the molds. Furthermore, any moisture present is thermally evaporated in a manner that provides for release of escaping water vapor without disrupting the consolidated, thermo-bonded core as pressure is relieved at the end of the pressing cycle. Moisture content of the mats introduced into the molds is preferably from about 5 weight %, more preferably from about 6 weight %, most preferably from about 8 weight %, up to about 20 weight %, more preferably up to about 16 weight %, and most preferably up to about 12 weight %, based on the total weight of the oven dry wood solids. Contrarily, expressed on the same oven dry basis, wet-formed mats after precompressing and prior to introduction into a hot pressing stage for dewatering, drying and consolidation are in a moisture content in a typical range of at least about five times, in another embodiment at least about seven times, in a further embodiment at least about eight times, and in an even further embodiment at least about ten times higher than the dry mats.

The duration of the pressing cycle, wherein the mat is in contact with the heated three-dimensional molds described herein, is preferably from about 30 seconds, more preferably from about 35 seconds, most preferably from about 40 seconds, preferably up to about 120 seconds, more preferably up to about 100 seconds, most preferably up to about 70 seconds, when using the subject preformed, pressed, dry mat. Contrarily, when the mats wet-formed by the processes of U.S. Pat. No. 5,900,304 or U.S. Pat. No. 4,702,870 employ the same three-dimensional molds during the pressing cycle, the duration of the press cycle is typically range from at least about 200 seconds up to about 800 seconds at comparable temperatures and pressures. Stated another way, the duration of the pressing cycle for the dry-formed mats of the present invention can be at least about two times less than, in another embodiment at least about three times less than, and in a further embodiment at least about four times less than the pressing cycle for wet-formed mats.

Reducing the pressing duration of the wet-formed mats may be theoretically possible by assuming that drying can occur at extreme temperatures and pressures, such as approximately 500° F. and pressures approaching 2,500 p.s.i. using the molds described herein. However, the ignition point of dried mats is typically at approximately 450° F. Therefore, dry-formed mats can be preferably pressed at temperatures of from about 260° F., more preferably from about 280° F., and most preferably from about 300° F., preferably up to temperature of about 410° F., more preferably up to about 380° F., and most preferably up to about 340° F. The dry-formed mats can be preferably be pressed at pressures of from about 500 p.s.i, more preferably from about 700 p.s.i, and most preferably from about 800 p.s.i, preferably up to a pressure of about 1,400 p.s.i, more preferably up to about 1,200 p.s.i, and most preferably up to about 1,000 p.s.i.

Not only can complex three-dimensional cores be produced from dry-formed fibers, but these dry formed cores are generally structurally stronger than comparable wet formed cores. This can be accomplished at much greater over-all energy efficiency and with none of the water pollution problems associated with wet formed processes. A related advantage of the dry-formed process is higher productivity and consequently, economy of industrial scale, as compared to wet processes, which are constrained with respect to industrial productivity and scalability.

Conventionally, it is proposed that superior molding characteristics and enhanced fiber-to-fiber bonding would occur with wet forming. This view is embodied in production of products such as SONOBoard™ and Gridcore™ attempt to gain efficiency by the integral formation of a core and face component into a sub-panel, two of which are then laminated to produce a stressed-skin sandwich panel. In this mode of production, much of the variability of wet forming resides in the face components, which are then sanded to achieve the requisite thickness calibration. The side-to-side variability thus imparted to the face plies in this mode of production introduces imbalance into the stressed-skin product which, in turn, results in a predisposition for warpage and bowing of the panel in use.

The present invention eliminates this predisposition for side-to-side imbalance by utilizing thin-board MDF. It also employs HDF faces or other facing materials of excellent uniformity and consistency. In the subject process, thickness control of the final product is effected by calibrating the core independently from the stressed skin panel faces, which may also be calibrated or surface-finished, if desired, without imparting imbalance to the stressed skin composite. Furthermore, front-side to back-side imbalance of the thin-board face panel is substantially minimized.

Another important advantage of utilizing thin board MDF or HDF face dry-formed panels is the avoidance of telegraphing of the core pattern through the faces. This is inherent and unavoidable with prior art wet-forming processes based on the use of an integral core and face sub-panel. In wet-formed technology, there is a shift in the index of refraction of the fibers as wet-formed fibers change direction from parallel to an angular orientation relative to the outside face, in the region around each deformable nubby mold insert employed to form a honeycomb core structure. The directional change in the integral core/face wet forming process renders indelible the telegraphed core pattern exhibited in the prior art used for producing SONOBoard™ and Gridcore™. Use of thin-board face technology with the dry formation of the three-dimensional core of the present invention can preferably be formed without substantial telegraphing through the thin-board face panel and thereby overcome the telegraphing problems inherent in the prior art, while producing a panel of excellent precision, flatness and strength.

Dry forming is preferred over wet-forming for producing curved panels either in a single step or multi-step thermo-forming process. Furthermore, the mold designs employed in the present dry-formed cores provide an opportunity for independent optimization of strength in the diagonal load-bearing elements of the core and receptivity of adhesives by the lamination platform elements, resulting in strong glue lines and, thereby, in strong panels. In contrast, the three-dimensional elastomeric molds and drainage elements employed in the wet forming process unavoidably introduce a plane of weakness along the glue line of finished panels that is coincident with the plane of maximum shear stress present when the center-laminated panel is subjected to flexural forces normal to the faces. This inherent deficiency results from diminished densification of the fiber web along the plane of attachment (and immobilization) of the elastomeric "nubby" elements onto the surface of the drainage element. This plane of reduced fiber densification is coincident with the plane of lamination and maximum shear stress during flexural loading of the panel normal to the plane, thereby limiting panel strength.

To facilitate the formation of deep drawn three-dimensional structures and strong laminated composites from dry-formed fiber mats, certain modifications can be incorporated in the present invention. These modifications can improve certain results when employing the mold design of U.S. Pat. No. 5,900,304. These modifications can include maintaining the geometric parameters of the mold within prescribed angles relative to the depth of the draws so as to attain fiber draw without tearing the pre-formed mat, while producing a core with laminating ridges that do not telegraph patterns through the stress-skin faces. The angles for the diagonal load-bearing elements can be within the range of preferably from about 35 degrees, more preferably from about 40 degrees, and most preferably from about 45 degrees, and preferably up to about 70 degrees, more preferably up to about 65 degrees, and most preferably up to about 60 degrees, measured from the longitudinal-transverse axes of the three-dimensional cores. These cores can have a range in depth in the vertical axis of preferably from about ¼", more preferably from about ⅜", and most preferably from about ½", and preferably up to about 1½", and more preferably up to about 1¼", and most preferably up to about 1".

These modifications can also include the incorporation of fillets and curved corners in the mold design to mitigate structural stress concentrations in the product, to facilitate fiber draw during the molding process at the intersection of the laminating platforms and load-bearing diagonal elements of the mold design. The width of ridge-tops and valleys comprising the laminating platform for facings is variable, dependent upon the depth and angles of the diagonal elements required to produce finished panels of a given thickness. The laminating platform can dimensioned to provide precise finished panel thickness, ample shear strength in the plane of lamination, and absence of telegraphing through the facing board. As a percentage of the horizontal plane of the facing board, the laminating platform dimension is preferably from about 10%, more preferably from about 12%, and most preferably from about 15%, up to about 30%, more preferably up to about 25%, and most preferably up to about 23%, of the contact area. Moreover, the radii of curvature for facilitating fiber draw, with the point of tangency on each edge, is preferably from about 5%, more preferably from about 10%, and most preferably from about 15%, up to about 35%, more preferably up to about 30%, and most preferably up to about 25%, of the distance across a ridge or valley, along the lateral laminating platform on each side of the ridge-top or valley.

These modification can further include independently varying the thickness and density of load-bearing and laminating elements of the three-dimensional core. The range of such wall thickness is preferably from about 0.080", more preferably from about 0.090", and most preferably from about 0.10", up to about 0.180", more preferably up to about 0.150", and most preferably up to about 0.120". The above-described density range is preferably from about 45 pounds per cubic foot, more preferably from about 50 pounds per cubic foot, most preferably from about 55 pounds per cubic foot, up to about 70 pounds per cubic foot, more preferably up to about 65 pounds per cubic foot, and most preferably up to about 60 pounds per cubic foot.

Figure 10:
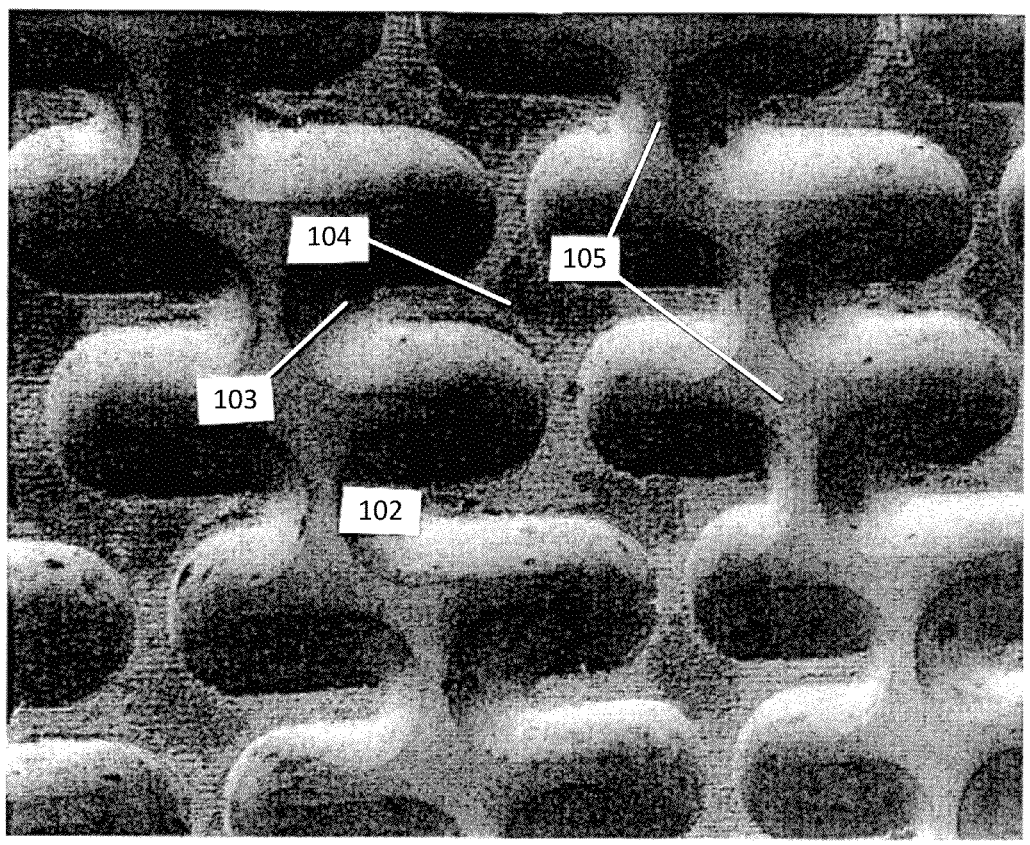
FIG. 10 is a plan view of a preferred three dimensional core configured to eliminate any uninterrupted straight and clear line of sight.
Figure 11:
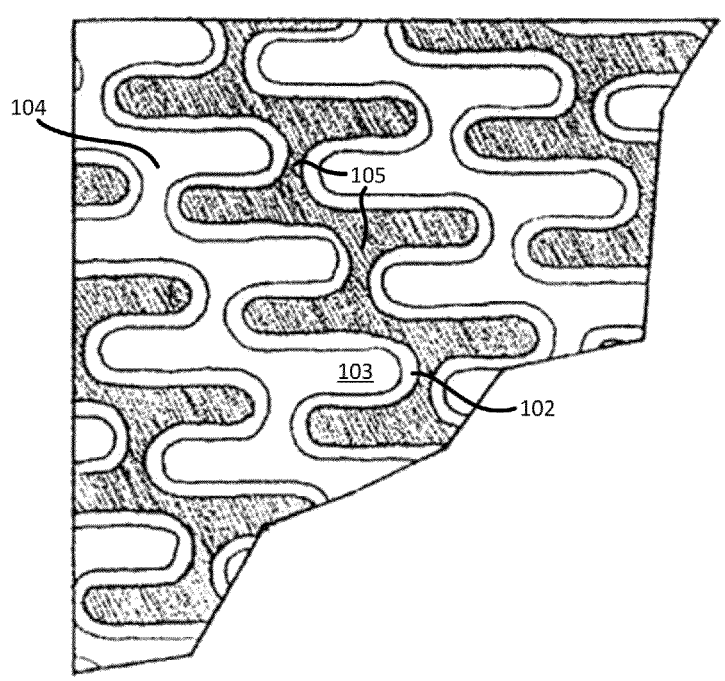
FIG. 11 is a sectional, plan schematic view of a uniformly strong deep drawn, three-dimensional, single-ply wood fiber structural core in which the longitudinal dimensions of adjoining ridges are alternatively shorter and longer to eliminate any uninterrupted straight and clear line of sight along the transverse row of adjoining ridges or valleys formed by the intersection of the syncline indentations and the anticline protrusions with the horizontal plane of the ridges.

The preferred longitudinal dimensions of the adjoining ridges are alternatively shorter and longer to eliminate any uninterrupted straight and clear line of sight along a transverse row of adjoining ridges 104 or valleys formed by the intersection of the syncline indentations 102 and anticline protrusions 103 with the horizontal plane of the ridges, i.e., the bridges 105 (see FIGS. 10 and 11). The structure shown in FIGS. 10 and 11 enables efficient production of deep drawn three-dimensional structural cores using dry-forming processes instead of wet-forming/press drying processes, without substantial telegraphing of said cores through applied thin board face panels.

Experiments were conducted with dry-formation, employing the method described herein within the parameters of the present invention. Flat Crush strength data was attained in these trials for panels produced using the dry formation process of the present invention. Published Flat Crush strength data was also obtained for wet-formed panels at equivalent weights. The data clearly demonstrates that the Flat Crush strength of panels produced by a method of the disclosure herein is at least about two times, preferably at least about three times, more preferably at least about four times, and most preferably at least about five times greater than that of published Flat Crush strength data for wet-formed panels at equivalent weights.

The invention claimed is:

1. A method for the dry-formation of a uniformly strong deep drawn, three-dimensional single-ply wood fiber structural core for use in making a panel having thin-board face panels, which comprises:
   providing a preformed, substantially flat, dry-formed single-ply mat of wood fibers having a moisture content in a range of 8 weight % to 16 weight %;
   precompressing said pre-formed single-ply mat of wood fibers;
   providing a three-dimensional mold which comprises laminating platforms, load-bearing diagonal elements, anticline protrusions having ridges, fillets and curved corners to facilitate fiber draw during the molding process at the intersection of the laminating platforms and load-bearing diagonal elements, the longitudinal dimensions of adjoining ridges being alternatively shorter and longer to eliminate any uninterrupted straight and clear line of sight along a transverse row of adjoining ridges or valleys formed by the intersection of syncline indentations and anticline protrusions with the horizontal plane of the ridges;
   introducing the precompressed dry-formed single-ply mat of wood fibers into the three-dimensional mold; and
   drawing and molding the precompressed dry-formed single-ply mat of wood fibers into said uniformly strong three-dimensional single-ply wood fiber structural core in a substantially single pressing motion, wherein the single-ply core has a depth in the vertical axis of about ½" up to about 1½", wherein the panel produced by attaching thin-board face panels to the outer surfaces of said single-ply core have a Flat Crush strength which is at least about two times greater than a Flat Crush strength of wet-formed panels at equivalent weights and thicknesses.

2. The method of claim 1, wherein the duration of the pressing contact time is not more than about 120 seconds.

3. The method of claim 1, wherein the duration of drawing and molding of the single-ply mat of wood fibers into said three-dimensional single-ply wood fiber structural core is at least about two times less than that of the wet-formation pressing cycle for drawing and molding the mat of wood fibers into said three-dimensional wood fiber structural core.

4. The method of claim 1, wherein a thin-board face panel is applied to the dry-formed three-dimensional single-ply wood fiber structural core, without substantial telegraphing through the thin-board face panel.

5. The method of claim 1, wherein drawing and molding the mat of wood fibers into said three-dimensional single-ply wood fiber structural core is pressed at temperatures of from about 260° F., up to about 410° F.

6. The method of claim 4, wherein front-side to back-side imbalance of the thin-board face panel is substantially minimized.

7. The method of claim 1, wherein the three-dimensional single-ply wood fiber structural core comprises diagonal load-bearing elements, and the angles for said diagonal load-bearing elements are from about 35 degrees up to about 70 degrees.

8. The method of claim 1, wherein drawing and molding the single-ply mat of wood fibers into said three-dimensional single-ply wood fiber structural core is pressed at pressures of from about 500 p.s.i., up to about 1,400 p.s.i.

9. The method of claim 8, wherein a thin-board face panel is applied to the dry-formed three-dimensional single-ply wood fiber structural core and the laminating platform dimension, as a percentage of the contact area of the horizontal plane of the thin-board face panel, is from about 10% up to 30%.

10. The method of claim 1, wherein the wall thickness of the three-dimensional single-ply wood fiber structural core is from about 0.080" up to about 0.180".

11. The method of claim 8, wherein the density of the three-dimensional single-ply wood fiber structural core is from about 45 pounds per cubic foot up to about 70 pounds per cubic foot.

12. A method for the dry-formation of a composite panel including a uniformly strong deep drawn, three-dimensional single-ply wood fiber structural core, having a thin-board face panels attached to the outer surfaces thereof, which comprises:
    forming a preformed, substantially flat, dry-formed single-ply mat of wood fibers having a moisture content in a range of 8 weight % to 16 weight %;
    precompressing said pre-formed single-ply mat of wood fibers;
    providing a three-dimensional mold which comprises laminating platforms, load-bearing diagonal elements, anticline protrusions having ridges, fillets and curved corners to facilitate fiber draw during the molding process at the intersection of the laminating platforms and load-bearing diagonal elements, the longitudinal dimensions of adjoining ridges being alternatively shorter and longer to eliminate any uninterrupted straight and clear line of sight along a transverse row of adjoining ridges or valleys formed by the intersection of syncline indentations and anticline protrusions with the horizontal plane of the ridges;
    introducing the precompressed dry-formed single-ply mat of wood fibers into the three-dimensional mold;
    drawing and molding the precompressed dry-formed single-ply mat of wood fibers into said uniformly strong three-dimensional single-ply wood fiber structural core in a substantially single pressing motion, wherein the single-ply core has a depth in the vertical axis of about ½" up to about 1½"; and
    attaching said thin-board face panels to said outer surfaces of said uniformly strong deep drawn, three-dimensional single-ply wood fiber structure core to form said composite panel, said composite panel having a Flat Crush strength which is at least about two times greater than a Flat Crush strength of wet-formed panels at equivalent weights and thicknesses.

13. The method of claim 12, wherein the duration of the drawing and molding step is not more than about 120 seconds.

14. The method of claim 12, wherein the duration of drawing and molding of the single-ply mat the single-ply mat of wood fibers into said three-dimensional single-ply wood fiber structural core is at least about two times less than that of the wet-formation pressing cycle for drawing and molding the mat of wood fibers into said three-dimensional wood fiber structural core.

15. The method of claim 12, wherein drawing and molding the single-ply mat of wood fibers into said three-dimensional single-ply wood fiber structural core is pressed at temperatures of from about 260° F., up to about 410° F.

16. The method of claim 12, wherein drawing and molding the single-ply mat of wood fibers into said three-dimensional single-ply wood fiber structural core is pressed at pressures of from about 500 p.s.i, up to about 1,400 p.s.i.

17. The method of claim 1, wherein panels produced by attaching thin-board face panels to the outer surfaces of said single-ply core have a Flat Crush strength which is at least about three times greater than a Flat Crush strength for wet-formed panels at equivalent weights and thicknesses.

18. The method of claim 1, wherein panels produced by attaching thin-board face panels to the outer surfaces of said single-ply core have a Flat Crush strength which is at least about four times greater than a Flat Crush strength for wet-formed panels at equivalent weights and thicknesses.

19. The method of claim 1, wherein panels produced by attaching thin-board face panels to the outer surfaces of said single-ply core have a Flat Crush strength which is at least about five times greater than a Flat Crush strength for wet-formed panels at equivalent weights and thicknesses.

20. The method of claim 1 wherein the precompressed dry-formed single-ply mat of wood fibers includes methylene diisocyanate resin.

21. The method of claim 12 wherein the precompressed dry-formed single-ply mat of wood fibers includes methylene diisocyanate resin.

\* \* \* \* \*